(12) United States Patent
Forster (10) Patent No.: US 7,225,992 B2
(45) Date of Patent: Jun. 5, 2007

(54) RFID DEVICE TESTER AND METHOD

(75) Inventor: Ian J. Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 273 days.

(21) Appl. No.: 10/367,515

(22) Filed: Feb. 13, 2003

(65) Prior Publication Data

US 2004/0160233 A1    Aug. 19, 2004

(51) Int. Cl.
*G06K 19/06*    (2006.01)

(52) U.S. Cl. ............... 235/492; 235/451; 235/382; 235/384; 340/572.01; 340/572.07

(58) Field of Classification Search ............. 235/492, 235/487, 380, 382, 384, 383, 385, 451; 340/572.01, 340/572.07
See application file for complete search history.

(56) References Cited

U.S. PATENT DOCUMENTS

| | | | |
|---|---|---|---|
| 3,579,113 A * | 5/1971 | Jabbar et al. ............. | 455/193.3 |
| 4,876,535 A | 10/1989 | Ballmer et al. | |
| 5,153,983 A | 10/1992 | Oyama | |
| 5,473,330 A * | 12/1995 | Lauro et al. ................... | 342/42 |
| 5,545,291 A | 8/1996 | Smith et al. | |
| 5,564,888 A | 10/1996 | Doan | |
| 5,621,199 A | 4/1997 | Calari et al. | |
| 5,783,856 A | 7/1998 | Smith et al. | |
| 5,824,186 A | 10/1998 | Smith et al. | |
| 5,854,480 A | 12/1998 | Noto | |
| 5,880,695 A * | 3/1999 | Brown et al. ........ | 343/700 MS |
| 5,904,545 A | 5/1999 | Smith et al. | |
| 5,983,363 A | 11/1999 | Tuttle et al. | |
| 6,001,211 A | 12/1999 | Hiroyuki | |
| 6,078,259 A * | 6/2000 | Brady et al. ............. | 340/572.7 |
| 6,104,291 A * | 8/2000 | Beauvillier et al. ...... | 340/572.1 |
| 6,107,920 A | 8/2000 | Eberhardt et al. | |
| 6,122,492 A | 9/2000 | Sears | |
| 6,145,901 A | 11/2000 | Rich | |
| 6,147,605 A | 11/2000 | Vega et al. | |
| 6,172,609 B1 | 1/2001 | Lu et al. | |
| 6,204,764 B1 | 3/2001 | Maloney | |

(Continued)

FOREIGN PATENT DOCUMENTS

DE        101 20 625        4/2001

(Continued)

*Primary Examiner*—Steven S. Paik
(74) *Attorney, Agent, or Firm*—Renner, Otto, Boisselle & Sklar, LLP (57) ABSTRACT

An RFID device tester includes coupling elements for capacitively coupling a reader to an RFID device to be tested. The reader may power the RFID device by sending an outgoing signal, such as an outgoing AC power signal, which may be rectified and/or reflected by the RFID device, if the RFID device is operating properly. The outgoing signal may have a frequency that is different from the resonant frequency of an antenna of the RFID device. A reader in the RFID device tester detects the reflected and/or transmitted signal to confirm proper operation of the RFID device. The RFID device tester may be used as part of a roll-to-roll process, to individually test RFID devices on a roll of material. By utilizing short-range capacitive coupling, difficulties caused by simultaneous activation of multiple RFID devices may be reduced or avoided.

34 Claims, 2 Drawing Sheets

U.S. PATENT DOCUMENTS

| | | |
|---|---|---|
| 6,206,292 B1 | 3/2001 | Robertz et al. |
| 6,219,543 B1 * | 4/2001 | Myers et al. .............. 455/423 |
| 6,236,316 B1 | 5/2001 | Eberhardt et al. |
| 6,262,292 B1 | 7/2001 | Yasuda et al. |
| 6,265,977 B1 | 7/2001 | Vega et al. |
| 6,274,508 B1 | 8/2001 | Jacobsen et al. |
| 6,281,038 B1 | 8/2001 | Jacobsen et al. |
| 6,291,896 B1 | 9/2001 | Smith |
| 6,316,278 B1 | 11/2001 | Jacobsen et al. |
| 6,380,729 B1 | 4/2002 | Smith |
| 6,384,727 B1 | 5/2002 | Diprizio et al. |
| 6,392,544 B1 | 5/2002 | Collins et al. |
| 6,404,339 B1 | 6/2002 | Eberhardt |
| 6,407,665 B2 | 6/2002 | Maloney |
| 6,415,978 B1 * | 7/2002 | McAllister ............ 235/462.01 |
| 6,417,025 B1 | 7/2002 | Gengel |
| 6,446,208 B1 * | 9/2002 | Gujar et al. ................ 713/185 |
| 6,451,154 B1 | 9/2002 | Grabau et al. |
| 6,487,681 B1 | 11/2002 | Tuttle et al. |
| 6,545,605 B2 * | 4/2003 | Van Horn et al. ....... 340/572.1 |
| 6,600,420 B2 | 7/2003 | Goff et al. |
| 6,677,852 B1 * | 1/2004 | Landt ...................... 340/10.1 |
| 6,683,254 B1 | 1/2004 | Gunnels |
| 2001/0006368 A1 | 7/2001 | Maloney |
| 2001/0054755 A1 | 12/2001 | Kirkham |
| 2002/0035701 A1 | 3/2002 | Casebolt et al. |
| 2002/0145520 A1 | 10/2002 | Maloney |

FOREIGN PATENT DOCUMENTS

| | | |
|---|---|---|
| EP | 0896706 | 6/2000 |
| WO | 82/00541 | 2/1982 |
| WO | 93/05489 | 3/1993 |
| WO | 00/16277 | 3/2000 |
| WO | 00/16280 | 3/2000 |
| WO | 00/41148 | 7/2000 |
| WO | 01/73864 | 4/2001 |
| WO | WO 01/25817 | 4/2001 |
| WO | 01/50547 | 7/2001 |
| WO | 01/71686 | 9/2001 |
| WO | WO 01/67413 | 9/2001 |
| WO | 01/80174 | 10/2001 |

* cited by examiner

RFID DEVICE TESTER AND METHOD

BACKGROUND OF THE INVENTION

1. Field of the Invention

This invention relates to the field of radio frequency identification (RFID) tag and label detection systems, and to methods of detecting RFID tags and labels.

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,292, all of which are hereby incorporated by reference in their entireties.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

One difficulty associated with RFID devices is the need to test operation of such devices as part of the manufacturing or fabrication process. In fabrication of RFID devices, the devices may be formed on a sheet or roll of material, closely spaced apart. In traditional methods of activating, reading, and/or detecting RFID devices, an antenna is used to send radio frequency (RF) fields over a relatively long range, that is, over intervening free space. When such methods are applied to testing closely-spaced RFID devices, it is difficult to test a single RFID device, since the RF field interacts with several devices simultaneously, and the various RFID devices may interact with one another.

In addition, it will be appreciated that lost-cost methods of reading RFID devices are desirable.

From the foregoing it will thus be appreciated that improvements in RFID device testing and reading would be desirable.

SUMMARY OF THE INVENTION

According to an aspect of the invention, an RFID device tester is capacitively coupled to an RFID device, in order to provide power from the tester to the device, and to receive a signal from the device to the tester.

According to another aspect of the invention, an RFID device tester provides power to an RFID device to be tested, by sending an outgoing power signal that is at a frequency other than the resonant frequency of the antenna of the RFID device.

According to yet another aspect of the invention, an RFID device tester has conductive coupling elements for capacitively coupling to antenna elements of an RFID device.

According to still another aspect of the invention, an RFID device tester has hoop-shaped conductive coupling elements.

According to a further aspect of the invention, a method of testing a radio frequency identification (RFID) device, includes the steps of: 1) capacitively coupling an RFID device tester to an antenna of the RFID device; 2) generating an outgoing signal from the RFID device tester; 3) using the outgoing signal to power the RFID device; 4) generating a return signal in the RFID device; and detecting a return signal, via a reader that is part of the tester.

According to a still further aspect of the invention, a radio frequency identification (RFID) device tester includes a reader; a pair of electrically-conductive coupling elements; a pair of transmission lines electrically connecting respective of the coupling elements to the reader; and a resistor connected to both of the transmission lines, between the reader and the coupling elements.

According to another aspect of the invention, in a combination of a radio frequency identification (RFID) device and an RFID device tester, the RFID device includes an antenna having a pair of antenna elements; and a chip operatively coupled to the antenna. The RFID device tester includes a reader; and a pair of electrically-conductive coupling elements electrically connected to the reader. The antenna elements are each capacitively coupled with respective of the coupling elements, thereby forming a pair of capacitors.

According to yet another aspect of the invention, a method of testing a radio frequency identification (RFID) device includes the steps of: shifting an optimum operating frequency of the device from a natural resonant frequency to a shifted resonant frequency; and reading the device at a frequency other than the natural resonant frequency.

According to still another aspect of the invention, a method of testing a radio frequency identification (RFID) strap includes the steps of: capacitively coupling an RFID device tester to conductive leads of the RFID strap; generating an outgoing signal from the RFID device tester; using the outgoing signal to power the RFID strap; generating a return signal in the RFID strap; and detecting a return signal, via a reader that is part of the tester.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

An RFID device tester includes coupling elements for capacitively coupling a reader to an RFID device to be tested. The reader may power the RFID device by sending an outgoing signal, such as an outgoing AC power signal, which may be rectified and/or reflected by the RFID device, if the RFID device is operating properly. The outgoing signal may have a frequency that is different from the resonant frequency of an antenna of the RFID device. A reader in the RFID device tester detects the reflected and/or transmitted signal to confirm proper operation of the RFID device. The RFID device tester may be used as part of a roll-to-roll process, to individually test RFID devices on a roll of material. By utilizing short-range capacitive coupling, difficulties caused by simultaneous activation of multiple RFID devices may be reduced or avoided.

Figure 1:
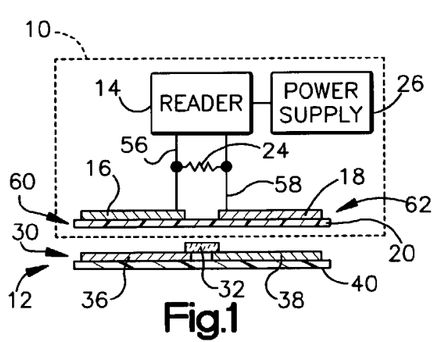
FIG. 1 is schematic side view of an RFID device tester capacitively coupled to an RFID device, in accordance with the present invention.
Figure 2:
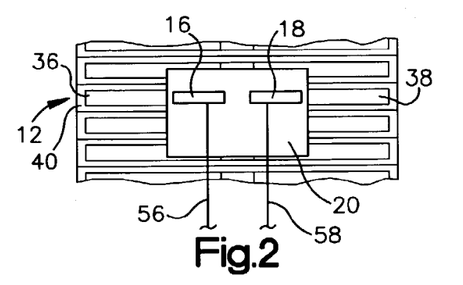
FIG. 2 is a top view of the RFID device tester and RFID device of FIG. 1.

Referring initially to FIGS. 1 and 2, illustrated is an RFID device tester 10 for testing or otherwise reading an RFID device 12. The tester includes a reader 14, and a pair of coupling elements or couplers 16 and 18 that are electrically coupled to the reader 14. The coupling elements 16 and 18 are electrically-conductive elements in any of a wide variety of suitable configurations. The coupling elements 16 and 18 may be placed on a dielectric substrate layer 20. In addition, the tester 10 may include a terminating resistor or load 24 that is connected between the coupling elements 16 and 18. As described in greater detail below, the terminating resistor 24 may function to restrict the strength of signals from the coupling elements 16 and 18 to the reader 14. A suitable power supply 26 may be used to power the reader 14.

The RFID device 12, which may be a label or a tag, or a part of a label or a tag, has an antenna 30, and a chip 32 coupled to the antenna 30. The chip 32 may include any of a variety of suitable electronic components, such as the circuitry described above for modulating the impedance of the RFID device 12. The antenna 30 may be a dipole antenna having a pair of antenna elements 36 and 38 on opposite sides of the chip 32. Alternatively, the antenna 30 may have another layout. The antenna elements 36 and 38 may be mounted on a dielectric substrate 40 of the RFID device 12. The dielectric substrate 40 may be part of a sheet of dielectric material, such as a roll of dielectric material, upon which other RFID devices are formed. The other RFID devices may be substantially the same as, or alternatively may be different from, the RFID device 12. More specifically, the dielectric substrate may have a plurality of RFID devices closely spaced together.

Figure 3:
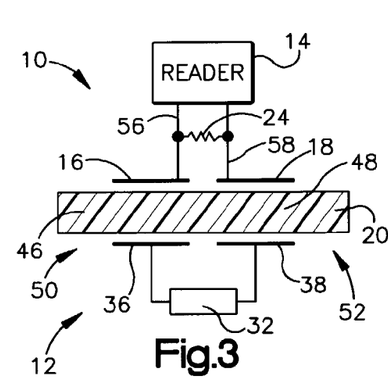
FIG. 3 is a circuit diagram illustrating the capacitive coupling of the RFID device tester and the RFID device of FIG. 1.

Making reference now also to FIG. 3, the RFID device tester 10 and the RFID device 12 are capacitively coupled together, to transfer power and/or signals between the RFID device tester 10 and the RFID device 12. The coupling elements 16 and 18 are operatively coupled to the antenna elements 36 and 38, respectively. This operative coupling is produced by orienting the RFID device tester 10 and the RFID device 12 such that the coupling elements 16 and 18 of the RFID device tester are substantially opposite the antenna elements 36 and 38 of the RFID device 12, as is illustrated in FIGS. 1–3. With such a relative orientation, a portion 46 of the dielectric substrate layer 20 is between the coupling element 16 and the antenna element 36, and another portion 48 of the dielectric substrate layer 20 is between the coupling element 18 and the antenna element 38. The coupling element 16, the antenna element 36, and the dielectric portion 46 thus function as a first capacitor 50, with the coupling element 16 and the antenna element 36 being plates of the capacitor 50, and the dielectric portion 46 being the dielectric of the capacitor 50. Similarly, the coupling element 18, the antenna element 38, and the dielectric portion 48 functions as a second capacitor 52.

Once the RFID device tester 10 and the RFID device 12 are capacitively coupled together, electrical power and/or signals may be transferred between the two. The reader may send an outgoing signal, such as an outgoing AC signal, along transmission lines 56 and 58 coupling the reader 14 with the coupling elements 16 and 18. The capacitors 50 and 52 allow transmission of the outgoing AC signal from the coupling elements 16 and 18 to the antenna elements 36 and 38. AC power received by the antenna elements 36 and 38 may be rectified by the chip 32, for instance by transistors and/or diodes that are part of the chip 32, to produce DC power to run the chip 32.

The power may be used by the chip 32 to send a return signal via the antenna elements 36 and 38. It will be appreciated that the sending of the return signal may be a passive process, rather than active transmission of a return signal by the RFID device 12. As one example, circuitry in the chip 32 may be used to modulate impedance of the RFID device 12. As another example, the RFID device 12 may reflect the incident signal back to the tester 10.

It will be appreciated that the RFID device 12 either may be a passive device that automatically responds to an incident signal, or may be an active device that only responds to incident signals conforming to certain protocols. The RFID device 12 may also have other components, such as its own power supply.

It will be further appreciated that the functioning of the RFID device 12 may be substantially the same as if incident energy was provided by a long-range RF field, rather than by capacitive coupling. Alternatively, the functioning of the RFID device 12 may be different, depending upon how the incident energy is provided to it.

The return signal generated by the RFID device 12 is transmitted from the antenna elements 36 and 38 to the coupling elements 16 and 18, via the capacitors 50 and 52. The return signal is then forwarded to the reader 14 along the transmission lines 56 and 58. The terminating resistor 24 may function to prevent excessively powerful signals from reaching the reader 14, and perhaps causing damage to the reader 14.

The reader 14 is able to interpret the return signal received from the RFID device 12 to confirm proper function of all or part of the RFID device 12, such as correct functioning of the antenna 30 and/or the chip 32. The confirming of proper functioning may include merely detecting the presence of the RFID device 12, such that if the RFID device 12 is detectable at all, functioning of the RFID device 12 is acceptable, and the RFID device 12 passes the test. Alternatively, the test may involve evaluation of the return signal received from the RFID device 12, for example to determine if the return signal conforms to one or more parameters or ranges of parameters. It will be appreciated that other tests of operation of the RFID device 12 may be employed, for example diagnosing faults of the RFID device 12 or otherwise qualitatively evaluating performance of the RFID device 12.

The outgoing AC power signal sent out by the reader 14 and the return signal generated by the RFID device 12 have been described above for clarity as separate signals, one sent out by the reader 14, and the other received by the reader 14. In actuality, it will be appreciated that the signals may in fact be superimposed upon one another, in that the reader 14 perceives a superposition of the outgoing signal and the return signal. Therefore the interpretation of the return signal by the reader 14 may involve a comparison between the outgoing signal and the signal perceived by the reader 14, a superposition of the outgoing signal and the return signal.

The RFID device tester 10, which capacitively couples to the RFID device 12, advantageously allows short-range coupling between tester 10 and RFID device 12. The RFID device 12 may be part of a sheet or roll having many RFID devices thereupon, and by using short-range capacitive coupling between the RFID device tester 10 and the RFID device 12, better testing of the RFID device 12 may be accomplished, compared to testers coupling to RFID devices via RF fields sent over free space. One reason for the advantage of the capacitively-coupling RFID device tester 10 is that the short-range capacitive coupling is less prone to provide energy to other RFID devices on the same roll or sheet. By reducing or limiting the providing of energy to RFID devices other than the RFID device 12 to be tested, there is better discrimination in the testing, and thus improved testing of the RFID device 12.

Appropriately selection of the frequency of the outgoing signal from the tester 10 may allow further reduction in undesired coupling to RFID devices other than the RFID device 12 that is being tested. In explaining this further, it will be useful to define a natural resonate frequency of the antenna 30 as the frequency at which the antenna 30 best receives energy from an external RF field, and at which it best sends energy, when not located in close proximity to the RFID device tester 10. This natural resonant frequency is the frequency at which an antenna impedance of the antenna 30 is the complex conjugate of a chip impedance of the chip 32. The resonant frequency is also referred to herein as the optimum operating point or optimum operating frequency of the RFID device 12. It will be appreciated that the resonant frequency of the antenna 30 may be highly dependent on the configuration of the antenna 30.

One advantage of the RFID device tester 10, which capacitively couples to the RFID device 12, is that the outgoing power signal from the reader 14 of the RFID device tester 10 may be at a frequency that is different from the natural resonant frequency of the antenna 30 of the RFID device 12 (different from the natural optimum operating point of the RFID device 12). By having the outgoing power signal at a different frequency from the natural resonant frequency for the antenna 30 of the RFID device 12, longer-range coupling may be minimized of the outgoing signals to RFID devices other than the desired RFID device 12 to be tested. This is because antennas of the RFID devices are less susceptible to receive significant amounts of power at frequencies different from the resonant frequency of the antenna 30. Further, having the outgoing power signal at a different frequency than the natural resonant frequency of the antenna 30 may reduce cross-coupling between the various antennas of various RFID devices on the same roll or sheet.

Coupling between the RFID device tester 10 and the RFID device 12 will itself alter the resonant frequency of the antenna 30 (the optimum operating frequency). This is because bringing the tester 10 into close proximity relative to the RFID device 12 alters the environment around the RFID device 12. One or more dielectric elements 60 (FIG. 1) and one or more electrically-conducting elements 62 (FIG. 1) of the RFID device tester 10 may thereby be introduced by the tester 10 into the environment perceived by and interacting with the RFID device 12 that is being tested. The dielectric elements 60 and the conducting elements 62 may be referred to as "shifting elements," since they function to shift or change the optimum operating frequency of the RFID device 12. As illustrated in FIG. 1, the dielectric elements 60 may include the dielectric substrate layer 20, and the conductor elements 62 may include the coupling elements 16 and 18. Alternatively or in addition, there may be other dielectric elements 60 and/or conductor elements 62, the latter of which may include metallic conductors. The location, size, and/or configuration of the dielectric elements 60 and/or the conductor elements 62 may be selected so as to produce a desired shift in the resonant frequency of the antenna 30.

Figure 4:
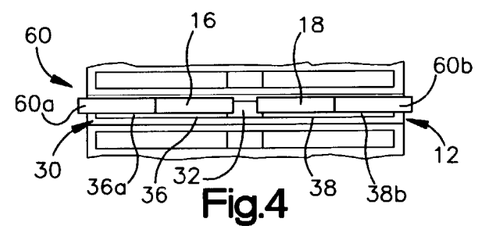
FIG. 4 is a top view illustrating parts of an embodiment of the RFID device tester of FIG. 1, which shifts the optimum operating frequency of an RFID device.
Figure 5:
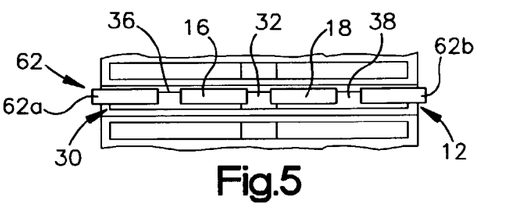
FIG. 5 is a top view illustrating parts of another embodiment of the RFID device tester of FIG. 1, which shifts the optimum operating frequency of an RFID device.

FIGS. 4 and 5 show illustrative examples of parts of RFID device testers 10 with additional dielectric elements 60 and/or conductor elements 62 for shifting or altering the resonant frequency of the antenna 30 of the RFID device 12. In FIGS. 4 and 5 the parts of the RFID device 12 are shown somewhat offset from corresponding parts of the RFID device tester 10 for illustration purposes.

FIG. 4 shows parts an embodiment of the RFID device tester 10 that includes additional dielectric elements 60*a* and 60*b* that are next to the coupling elements 16 and 18. The dielectric elements 60*a* and 60*b* are placed over or opposite respective portions 30*a* and 30*b* of the antenna elements 36 and 38 of the antenna 30 of the RFID device 12. As shown, the dielectric elements 60*a* and 60*b* are further from the chip 32 of the RFID device 12, although it will be appreciated that other suitable configurations may be utilized.

The dielectric elements 60*a* and 60*b* function to load the antenna 30 and increase the effective length of the antenna elements 36 and 38 of the antenna 30. By an increase in effective length, what is meant is that the resonant frequency or optimum operating frequency of the RFID device 12 is decreased.

The dielectric elements 60a and 60b may be made of a high K dielectric material, such as a suitable ceramic material. Examples of suitable materials are barium tetra titanate and titanium oxide.

Turning to FIG. 5, parts of an embodiment of the RFID device tester 10 is shown that has additional electrically-conducting elements 62a and 62b, separate from the coupling elements 16 and 18, that are in close proximity to the antenna elements 36 and 38 of the antenna 30 of the RFID device 12. The conducting elements 62a and 62b are capacitively coupled to the antenna elements 36 and 38, increasing the effective length of the antenna elements. The resonant frequency or optimum operating point of the RFID device 12 is thereby decreased.

Although the configuration of the conducting elements 62a and 62b in FIG. 5 results in a decrease in the resonant frequency or optimum operating point of the RFID device 12, it will be appreciated that differently configuring the conducting elements 60a and 60b relative to the RFID device 12 may result in an increase in the resonant frequency or optimum operating point of the RFID device 12.

The shift in resonant frequency or optimum operating point caused by the dielectric elements 60 or the conducting elements 62 is localized, in that the dielectric elements 60a, 60b and/or the conducting elements 62a, 62b may be configured to shift the frequency of only a single RFID device 12, while leaving the optimum operating point of adjacent RFID devices large unaffected.

It will appreciated that the number and configuration of the dielectric elements 60a and 60b and the conducting elements 62a and 62b may be varied, and may be optimized for selected antenna configurations and/or for a desired testing frequency, for example.

The shift in the resonant frequency of the antenna 30, caused by bringing the RFID device 12 and the RFID device tester 10 together, may aid in operatively isolating the RFID device 12 from other RFID devices that may be nearby. By operatively isolating the RFID device 12, it may be easier to test the RFID device 12 without encountering undesired results due to activation or interference from other RFID devices that are not presently being tested. Since the RFID device 12 to be tested may be closer than other RFID devices to the dielectric elements 60 and the conducting elements 62, resonant frequency shifts of the other RFID devices may be substantially reduced in magnitude or avoided altogether, when compared with the resonant frequency shift of the RFID device 12 to be tested. Put another way, the shift in resonant frequency occasioned by the dielectric elements 60 and/or the conducting elements 62 may be substantially or largely limited to a single RFID device, the RFID device 12 to be tested.

As an example, the dielectric elements 60 and/or the conducting elements 62 may be suitably configured so as to shift an antenna having an optimum operating frequency of 915 MHz to an optimum operating frequency of 2450 MHz.

It will be appreciated that the above-described concept of shift optimum operating frequency of the RFID device 12 is but one example of a broader concept. More broadly, testing may be accomplished by shifting the optimum operating frequency of one or more RFID devices, and then testing RFID device(s). The device(s) tested may be (as described above) one or more RFID devices that have had their optimum operating frequency shifted. Alternatively, testing may be performed on one or more devices with unshifted frequencies, with other untested RFID devices having frequencies shifted.

It will further be appreciated that different optimum operating frequency shifts may be provided to different RFID devices to be tested. Varying the frequency shift for different RFID devices may facilitate testing multiple RFID devices simultaneously.

In addition, it will be appreciated that the RFID device tester 10 may have multiple parts, with for example the dielectric elements 60 and/or the conducting elements 62 separate from other parts of the tester 10.

The tester operating frequency of the RFID device tester 10 may be selected so as to provide sufficient energy to activate the RFID device 12 that is being tested, and avoiding providing substantial amounts of energy to other RFID devices that may otherwise produce signals interfering with test results. As suggested by the above discussion, the tester operating frequency may be different from the natural resonant frequency of the antenna 30, and/or may be substantially the same as the new resonant frequency of the antenna 30 (the resonant frequency of the antenna 30 as shifted due to its proximity to the RFID device tester 10).

Alternatively, the tester operating frequency may be selected from a broad range of suitable RF frequencies for operatively coupling the tester 10 and the RFID device 12. The RF frequencies utilized may be greater than or less than the antenna natural frequency and/or the new antenna resonant frequency (shifted due to the proximity of the tester 10 to the RFID device 12). It will be appreciated, however, that RF frequencies that stray too far from the new antenna resonant frequency (shifted optimum operating frequency) may be unsuitable. For example, there may be a lower limit for suitable RF frequencies due to increases in impedance of capacitive paths, for a given coupling area, as frequencies are reduced. This increase in impedance may make it more difficult to send power into the chip. As another example of a reason for a lower frequency limit, internal rectifiers in the chip 32 may have an integrating filter after them, to aid in creating the DC power supply to run the chip 32. If the frequency of the incident RF energy received from the tester 10 is too low, the filter may be unable to adequately smooth the rectified waveform output from the rectifiers. The result may be an unacceptable DC power supply for the chip 32.

There also may be an upper limit for suitable RF frequencies for the operating frequency for the tester 10. As frequency increases, rectifier efficiency within the chip 32 decreases, reducing the fraction of input energy that is converted to DC energy to run the chip 32. Another reason for an upper limit for suitable operating frequencies is that the chip 32 may have a large input capacitance that acts as a voltage divider in conjunction with the coupling capacitors 50 and 52. As frequency of the incoming signal is increased, it therefore becomes more difficult to coupled power into the RFID device 12.

According to a specific example, the coupling elements 16 and 18 may be 3 mm×20 mm plates. The separation distance between the coupling elements 16 and 18 and the antenna elements 36 and 38 may be about 0.2 mm. Assuming that the relative dielectric constant of the intervening dielectric material is 3, the capacitance of each of the capacitors 50 and 52 is 7.97 pF.

The coupling elements 16 and 18 are shown in FIG. 1 as approximately the same size as the corresponding antenna elements 36 and 38. It will be appreciated, however, that coupling elements 16 and 18 may be larger or smaller than the antenna elements 36 and 38 (for example as shown in FIG. 2).

It will be appreciated that the RFID device tester 10 may have other components in addition to those shown and described above. For example, the outgoing AC power signal may include sending signals along the transmission lines 56 and 58 that are 180 degrees out of phase with each other. A balance transformer may be utilized to produce the out of phase RF signals.

As another example, the RFID device tester 10 may have a matching network between the reader 14 and the transmission lines 56 and 58. The matching network may be utilized to change the impedance of the signal transmitted from the reader 14 to the transmission lines 56 and 58. For example, the characteristic impedance of the reader 14 may be on the order of 50 ohms, while the desired impedance of the field set up by the transmission lines 56 and 58 may be 200 ohms. The matching network may be used to shift the impedance of the signal from the reader 14 to the desired impedance for the transmission lines 56 and 58.

Figure 6:
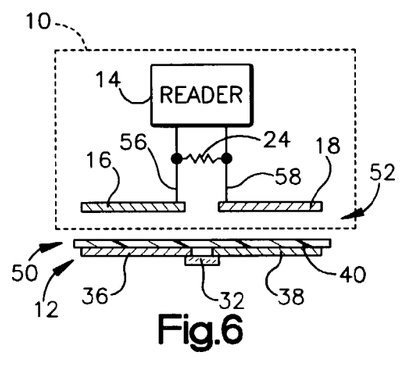
FIG. 6 illustrates an alternate embodiment RFID device tester, capacitively coupled to an RFID device, in accordance with the present invention.

FIG. 6 shows an alternative relative orientation between the RFID device tester 10 and the RFID device 12, in which the RFID device 12 is inverted as compared to the orientation shown in FIGS. 1 and 2, and described above. In the configuration shown in FIG. 6, portions of the dielectric substrate 40 of the RFID device 12 act as the dielectric of the capacitors 50 and 52. The dielectric layer 20 of the RFID device tester 10 (FIG. 1) may thus be omitted.

As a further alternative, it will be appreciated that an air gap may be used as the dielectric for the capacitors 50 and 52. The RFID device tester 10 and/or the RFID device 12 may have structures or other elements to maintain a repeatable air gap between the coupling elements 16 and 18 of the RFID device tester 10, and the antenna elements 36 and 38 of the RFID device 12.

Figure 7:
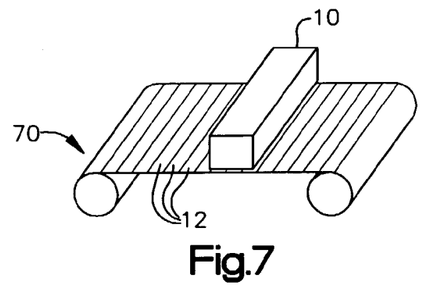
FIG. 7 illustrates an RFID device tester testing a roll of RFID devices in a roll-to-roll process, in accordance with the present invention.

Turning now to FIG. 7, the RFID device tester 10 may be utilized in a roll-to-roll process to test a plurality of RFID devices 12 that are parts of or are on a roll material 70. The tester 10 may be fixed in location, with the various RFID devices 12 being tested one at a time as they move past the tester 10. The roll material 70 may be appropriately driven to move the RFID devices 12 past the tester 10. The RFID devices 12 may move continuously past the tester 10, or alternatively each of the RFID devices 12 may pause to be tested as it passes under the RFID device tester 10. The RFID device tester 10 may be coupled to a computer or other device for recording results of the testing of the various RFID devices, and for enabling the devices to be matched up with their test results.

The roll-to-roll process illustrated in FIG. 7 may be part of or may be operatively coupled with a larger roll-to-roll process for fabricating RFID devices. It will be appreciated that roll-to-roll fabrication processes for producing RFID devices may include many well-known steps, such as depositing various layers (e.g., adhesive layers, metal layers, and/or printable layers), modifying the layers (e.g., selectively removing parts of a metal layer to create an antenna), and/or depositing various components (e.g., a chip). Further details regarding roll-to-roll fabrication processes for RFID devices may be found in U.S. Pat. No. 6,451,154, which is hereby incorporated by reference in its entirety.

Figure 8:
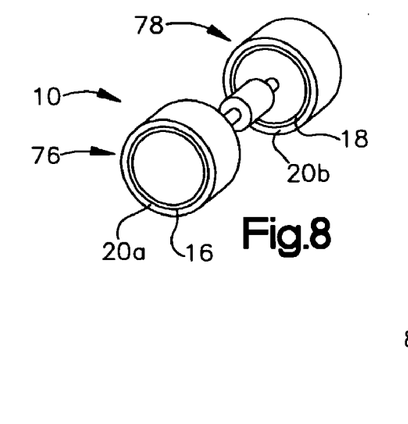
FIG. 8 is a view illustrating another embodiment RFID device tester in accordance with the present invention.

Another alternative configuration for the RFID device tester 10 is shown in FIG. 8, wherein the coupling elements 16 and 18 and dielectric layers 20a and 20b covering the coupling elements 16 and 18, are parts of the wheels 76 and 78. Thus, the coupling elements 16 and 18 and the dielectric layers 20a and 20b may be annular or hoop-shaped. The coupling elements 16 and 18 may be coupled to the reader 14 in a manner similar to the coupling described above with regard to other embodiments.

The RFID device tester 10 shown in FIG. 8 may be rolled over a stationary sheet or roll of material having a plurality of RFID devices 12 to be tested. Alternatively, the RFID device tester 10 may be kept stationary as the sheet or roll of RFID devices 12 moves, in contact with the wheels 76 and 78. The device tester 10 may advantageously help maintain a consistent distance between the coupling elements 16 and 18 of the tester 10, and the antenna elements 36 and 38 of the RFID device 12.

Figure 9:
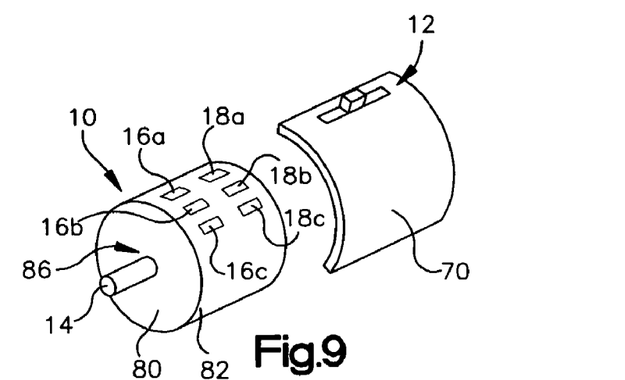
FIG. 9 is a view illustrating yet another embodiment RFID device tester in accordance with the present invention.
Figure 10:
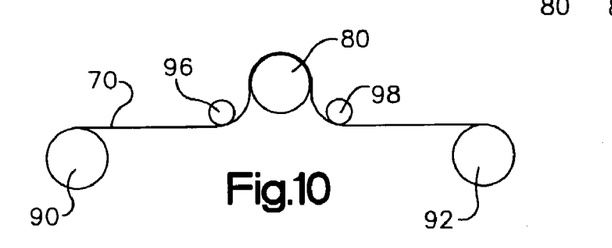
FIG. 10 illustrates the RFID device tester of FIG. 9 as part of a roll-to-roll process.

Yet another alternative configuration for the RFID device tester 10 is shown in FIGS. 9 and 10. The tester 10 shown in FIG. 9 allows for testing of RFID devices 12 in a roll-to-roll process, with the RFID devices 12 being in a fixed relationship in close proximity to a pair of coupling elements for a minimum amount of time, even while the roll material 70 is constantly in motion. In addition, the tester 10 shown in FIG. 9 advantageously enables testing of multiple RFID devices 12 at one time.

As shown in FIG. 9, the tester 10 includes a roller 80 that has multiple pairs of coupling elements 18a, 16a; 18b, 16b; and 18c, 16c thereupon or therein, along or on an outer surface 82 of the roller 80. The roll material 70, with various RFID devices 12 thereupon, winds around the roller 80. The outer surface 82 of the roller 80 moves at the same speed as the roll material 70, such that the roll material 70 does not substantially slip relative to the roller 80. It will be appreciated that the RFID device 12 thus maintains its position relative the corresponding pair of coupling elements 16c and 18c, for a certain coupling time period (as long as the part of the roll material 70 with the RFID device 12 is in contact with the outer surface 82 of the roller 80). The RFID device 12 may thus be suitably coupled to a corresponding pair of coupling elements 16c and 18c, for a coupling time period.

The rotation speed of the roller 80 and the roll material 70 may be selected such that the coupling time is sufficient to allow for testing of the RFID device 18. It will also be appreciated that, for a given rotation speed, use of a larger diameter roller results in a longer coupling time.

The various coupling elements 16a–c and 18a–c are coupled to a reader 14 having multiple outputs, via a rotary joint 86. It will be appreciated that pairs of coupling elements may be evenly spaced around the outer surface 82 of the roller 80, at a spacing corresponding to the spacing of the RFID devices 12 on the roll material 70. Having multiple pairs of coupling elements on the roller 80 may enable testing of multiple RFID devices 12 simultaneously, which advantageously speeds the testing process.

Referring to FIG. 10, the roll material 70 may move from a supply roll 90 to a take-up roll 92. Rollers 96 and 98 may be used in conjunction with the roller 80 to maintain a portion of the roll material 70 against the roller 80. The roll material 70 may be moved from the supply roll 90 to the take-up roll 92 by one or more suitable motors driving one or more of the rollers 80, 96, and 98, and/or one or both of the rolls 90 and 92.

The configuration of the rolls 90 and 92, and the rollers 80, 96, and 92, shown in FIG. 10, is an illustration of one of a large variety-of suitable configurations, which may include other rollers, mechanisms, and/or devices.

It will be appreciated that an RFID tester in the configuration employed in FIG. 9 may have coils as part of its coupling elements 16a–c, 18a–c, and thus may be able to test RFID devices that are not high-frequency devices. For example, the tester may be configured to test 13.56 MHz RFID devices. Thus the coupling between the pairs of coupling elements 16a–c, 18a–c may be capacitive, or alternatively may be by another suitable mechanism.

It will be appreciated that the various embodiments of the RFID device tester 10 may also be employed as readers, to detect the presence of RFID devices 12 or to otherwise receive information from RFID devices 12.

It will further be appreciated that a capacitively coupling RFID device tester/reader such as described above may have a variety of suitable configurations. For example, the RFID device tester/reader may have suitably-shaped slots or other openings for receiving RFID devices to be tested or read, or for receiving objects having RFID devices attached or otherwise coupled thereto.

As noted above, the RFID device may be a part of a tag or label. For example, the RFID device may be a RFID strap having a chip attached to conductive leads that do not function as a conventional antenna. Examples include an RFID strap available from Alien Technologies, and the strap marketed under the name I-CONNECT, available from Philips Electronics. Thus the various embodiments of the tester may be suitable for use in testing a roll of RFID straps, with conductive elements of the RFID tester placed in proximity to the conductive leads of the RFID strap.

Figure 11:
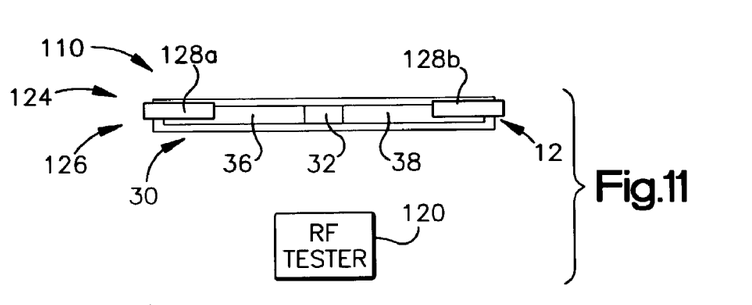
FIG. 11 is a top view of an RFID device test system in accordance with the present invention.
Figure 12:
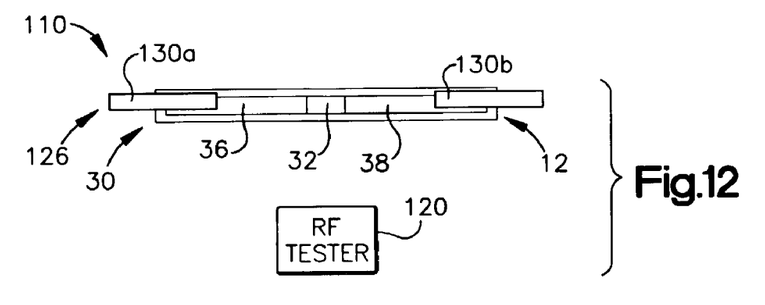
FIG. 12 is a top view of another RFID device test system in accordance with the present invention.

In FIGS. 11 and 12 embodiments of an RFID device test system 110 are shown. The RFID device test system 110 includes an RF tester 120 and a test fixture 124. The test fixture 124 includes shifting elements 126 for shifting or changing the resonant frequency or optimum operating frequency of an RFID device 12 that is in close proximity to the test fixture 124. The shifting elements 126 may include dielectric elements 128a and 128b (FIG. 11) for decreasing effective length of the antenna elements 36 and 38 of the RFID device 12. Alternatively, the shifting elements 126 may include electrically-conducting elements 130a and 130b (FIG. 12) for increasing effective length of the antenna elements 36 and 38 of the RFID device 12. Thus the test fixture 124 may shift the resonant frequency or optimum operating frequency of the RFID device 12 in a manner similar to that of the RFID devices testers 10 shown in FIGS. 4 and 5, and described above. This shifting of resonant frequency or optimum operating frequency may be localized, and may be substantially limited to a single RFID device 12 on a roll or sheet 134 of RFID devices. Thus the test fixture 124 may enable RFID devices to be tested singularly, despite their close proximity to other substantially-identical RFID devices.

The RF tester 120 may be a conventional RF reader for reading RFID devices through generation of a relatively long-range RF field, and detection of changes in the RF field that occur due to the presence of an RFID device within the field. Further information regarding suitable RF readers may be found in U.S. Pat. Nos. 5,621,199 and 6,172,609, both of which are incorporated herein by reference in their entirety.

The RFID device 12 may be tested by having the RF reader 120 emit energy at a frequency corresponding to the shifted resonant frequency or optimum operating frequency of the RFID device 12 in the test fixture 124. Since this frequency is different from the natural resonant frequency of other RFID device on the roll or sheet 134, substantial coupling with the RF tester 120 may be confined to the single RFID device 12 that is being tested. After testing, the sheet or roll 134 may be shifted relative to the test fixture 124, allowing testing of another RFID device. Thus long-range non-capacitive coupling may be used to couple to individual RFID devices on a sheet or roll of such devices.

It will be appreciated that the RFID device test systems 110 shown in FIGS. 11 and 12 may be modified, as suitable, in manners similar to the various modifications described for the RFID device testers 10. For example, the test fixture 124 may be incorporated into a roller, to facilitate sing the RFID device test system 110 as part of a roll-to-roll process.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of testing a radio frequency identification (RFID) device, comprising:

capacitively coupling an RFID device tester to an antenna of the RFID device;

generating an outgoing signal from the RFID device tester;

using the outgoing signal to power the RFID device;

generating a return signal in the RFID device;

detecting the return signal, via a reader that is part of the tester; and prior to the generating the outgoing signal, shifting an optimum operating frequency of the antenna from a natural resonant frequency of the antenna to a shifted resonant frequency;

wherein the generating the outgoing signal includes generating the outgoing signal at a signal frequency that is different from the natural resonant frequency of the antenna;

wherein the shifting the optimum operating frequency includes decreasing the optimum operating frequency;

wherein the decreasing the optimum operating frequency includes overlapping portions of the antenna elements with dielectric elements;

wherein the dielectric elements include a ceramic material; and wherein the ceramic material includes a material selected from the group consisting of barium tetra titanate and titanium oxide.

2. A method of testing a radio frequency identification (RFID) device on a sheet or roll with other RFID devices, comprising:

capacitively coupling an RFID device tester to an antenna of the RFID device;

generating an outgoing signal from the RFID device tester;

using the outgoing signal to power the RFID device;

generating a return signal in the RFID device;

detecting the return signal, via a reader that is part of the tester; and prior to the generating the outgoing signal, shifting an optimum operating frequency of the antenna from a natural resonant frequency of the antenna to a shifted resonant frequency that is different from an unshifted natural resonant frequency of the other RFID devices on the sheet or roll;

wherein the generating the outgoing signal includes generating the outgoing signal at a signal frequency that is different from the natural resonant frequency of the antenna; and wherein the shifting the optimum operating frequency includes increasing the optimum operating frequency.

3. The method of claim 2, wherein the increasing the optimum operating frequency includes bringing electrically-conducting elements in close proximity to antenna elements of the antenna.

4. A method of testing a radio frequency identification (RFID) device, comprising:
   capacitively coupling an RFID device tester to an antenna of the RFID device;
   generating an outgoing signal from the RFID device tester;
   using the outgoing signal to power the RFID device;
   generating a return signal in the RFID device; and
   detecting the return signal, via a reader that is part of the tester;
   wherein the RFID device tester includes coupling elements electrically connected to the reader;
   wherein the antenna of the RFID device includes antenna elements;
   wherein the capacitively coupling includes aligning the coupling elements with respective of the antenna elements;
   wherein the coupling elements are attached to a dielectric layer; and
   wherein the aligning includes having portions of the dielectric layer between the coupling elements and the antenna elements.

5. A method of testing a radio frequency identification (RFID) device, comprising:
   capacitively coupling an RFID device tester to an antenna of the RFID device;
   generating an outgoing signal from the RFID device tester;
   using the outgoing signal to power the RFID device;
   generating a return signal in the RFID device; and
   detecting the return signal, via a reader that is part of the tester;
   wherein the RFID device tester includes coupling elements electrically connected to the reader;
   wherein the antenna of the RFID device includes antenna elements;
   wherein the capacitively coupling includes aligning the coupling elements with respective of the antenna elements;
   wherein the coupling elements are part of a roller,
   wherein the RFID device is part of a roll material; and
   wherein the aligning includes bringing the portion of the roll material having the RFID device into alignment with the coupling elements as the roller rotates.

6. The method of claim 5, wherein the aligning is part of a roll-to-roll process.

7. A method of testing a radio frequency identification (RFID) device, comprising:
   capacitively coupling an RFID device tester to an antenna of the RFID device;
   generating an outgoing signal from the RFID device tester;
   using the outgoing signal to power the RFID device;
   generating a return signal in the RFID device; and
   detecting the return signal, via a reader that is part of the tester;
   wherein the detecting the return signal includes:
      capacitively transmitting the return signal from the antenna to coupling elements of the RFID device tester; and
      forwarding the return signal from the coupling elements to the reader; and
   wherein the forwarding includes forwarding the return signal past a resistor coupled to a pair of transmission lines electrically connecting the reader and respective of the coupling elements.

8. A radio frequency identification (RFID) device tester comprising:
   a reader;
   a pair of electrically-conductive coupling elements;
   a pair of transmission lines electrically connecting respective of the coupling elements to the reader; and
   a resistor connected to both of the transmission lines, between the reader and the coupling elements.

9. The device tester of claim 8, further comprising dielectric materials on outer surfaces of each of the coupling elements.

10. The device tester of claim 9, wherein the dielectric materials are portions of a dielectric layer.

11. The device tester of claim 8, wherein the coupling elements are substantially planar.

12. The device tester of claim 8, wherein the coupling elements are hoop-shaped.

13. The device tester of claim 8, further comprising dielectric elements for shifting an optimum operating frequency of RFID devices placed in close proximity to the device tester.

14. The device tester of claim 13, wherein the dielectric elements include ceramic elements.

15. The device tester of claim 8, further comprising additional electrically-conducting elements for shifting an optimum operating frequency of RFID devices placed in close proximity to the device tester.

16. The device tester of claim 8, in combination with an RFID device, wherein the RFID device includes an antenna that is capacitively coupled to the coupling elements.

17. The combination of claim 16, wherein the antenna includes a pair of antenna elements; and wherein each of the antenna elements is capacitively coupled to respective of the coupling elements.

18. The device tester of claim 8, wherein the coupling elements are part of a roller.

19. The device tester of claim 18, wherein the coupling elements are on an outer surface of the roller.

20. The device tester of claim 19, further comprising additional pairs of coupling elements on the outer surface of the roller, wherein the additional pairs of coupling elements are also coupled to the reader.

21. The device tester of claim 20, wherein the pairs of coupling elements are substantially evenly circumferentially spaced about the outer surface of the roller.

22. In combination, a radio frequency identification (RFID) device and an RFID device tester comprising:
   the RFID device, which includes:
      an antenna having a pair of antenna elements; and
      a chip operatively coupled to the antenna;

the RFID device tester, which includes;
a reader; and
a pair of electrically-conductive coupling elements electrically connected to the reader; and
dielectric materials;
wherein the antenna-elements are each capacitively-coupled with respective of the coupling elements, thereby forming a pair of capacitors; and
wherein the dielectric materials are parts of the capacitors, between the coupling element and the antenna element of respective of the capacitors.

23. The combination of claim 22, wherein the dielectric materials are parts of the RFID device.

24. The combination of claim 22, wherein the dielectric materials are parts of the RFID device tester.

25. The combination of claim 22, wherein the dielectric materials are portions of a unitary dielectric layer.

26. The combination of claim 22, further comprising:
respective transmission lines electrically connecting the coupling elements to the reader; and
a resistor between the transmission lines.

27. A method of testing a radio frequency identification (RFID) device, comprising:
shifting an optimum operating frequency of the device from a natural resonant frequency to a shifted resonant frequency; and
reading the device at a frequency other than the natural resonant frequency;
wherein the shifting include pacing the device in close proximity to shifting elements that shift optimum operating frequency; and
wherein the shifting elements are parts of an RFID device tester that also performs the reading of the device.

28. The method of claim 27, wherein the reading includes capacitively coupling the tester and the device.

29. The method of claim 27,
wherein the testing is performed while the RFID device is on a sheet or roll with other RFID devices; and
wherein the shifting includes shifting to the shifted resonant frequency that is different from an unshifted natural resonant frequency of the RFID devices on the sheet or roll.

30. A method of testing a radio frequency identification (RFID) device, comprising:
shifting an optimum operating frequency of the device from a natural resonant frequency to a shifted resonant frequency; and
reading the device at a frequency other than the natural resonant frequency;
wherein the shifting include pacing the device in close proximity to shifting elements that shift optimum operating frequency; and
wherein the shifting elements are part of a test fixture that is separate from an RFID device tester that performs the reading of the device.

31. The method of claim 30, wherein the reading includes radio frequency coupling a reader to the device.

32. The method of claim 30,
wherein the testing is performed while the RFID device is on a sheet or roll with other RFID devices; and
wherein the shifting includes shifting to the shifted resonant frequency that is different from an unshifted natural resonant frequency of the other RFID devices on the sheet or roll.

33. A method of testing a radio frequency identification (RFID) device on a sheet or roll with other RFID devices, comprising:
shifting an optimum operating frequency of the device from a natural resonant frequency to a shifted resonant frequency that is different from an unshifted natural resonant frequency of the other RFID devices on the sheet or roll; and
reading the device at a frequency other than the natural resonant frequency;
wherein the shifting include pacing the device in close proximity to shifting elements that shift optimum operating frequency;
wherein the RFID device includes an antenna with antenna elements; and
wherein the shifting includes at least partially overlapping the antenna elements with the shifting elements.

34. A method of testing a radio frequency identification (RFID) device on a sheet or roll with other RFID devices, comprising:
shifting an optimum operating frequency of the device from a natural resonant frequency to a shifted resonant frequency that is different from an unshifted natural resonant frequency of the other RFID devices on the sheet or roll; and
reading the device at a frequency other than the natural resonant frequency;
wherein the shifting include pacing the device in close proximity to shifting elements that shift optimum operating frequency; and
wherein the shifting includes capacitively coupling the shifting elements to an antenna of the device.

\* \* \* \* \*

UNITED STATES PATENT AND TRADEMARK OFFICE
CERTIFICATE OF CORRECTION

PATENT NO.       : 7,225,992 B2
APPLICATION NO.  : 10/367515
DATED            : June 5, 2007
INVENTOR(S)      : Forster It is certified that error appears in the above-identified patent and that said Letters Patent is hereby corrected as shown below:

Col. 6, Ln. 60, replace "30a and 30b" with --36a and 38b--.
Col. 7, Ln. 22, replace "60a and 60b" with --62a and 62b--.
Claim 5, col. 13, ln. 57, replace "," with --;--.
Claim 5, col. 13, ln. 58, replace ":" with --;--.
Claim 22, col. 14, ln. 64, insert --,-- after tester
Claim 22, col. 15, ln. 1, replace ";" with --:--.
Claim 22, col. 15, ln. 6, delete "-" after "antenna"
Claim 22, col. 15, ln. 6, delete "-" after "capacitively"
Claim 27, col. 15, ln. 29, replace "include pacing" with --includes placing--.
Claim 27, col. 15, ln. 30, add --the-- before "optimum".
Claim 30, col. 16, ln. 1, replace "include pacing" with --includes placing--.
Claim 30, col. 16, ln. 2, add --the-- before "optimum".
Claim 33, col. 16, ln. 26, replace "include pacing" with --includes placing--.
Claim 33, col. 16, ln. 27, add --the-- before "optimum".
Claim 34, col. 16, ln. 43, replace "include pacing" with --includes placing--.
Claim 34, col. 16, ln. 44, add --the-- before "optimum".

Signed and Sealed this

Seventh Day of August, 2007

JON W. DUDAS
*Director of the United States Patent and Trademark Office*